(No Model.)

L. DATHIS, FILS.
BAKER'S OVEN.

No. 323,643.  Patented Aug. 4, 1885.

Witnesses  Léon Dathis fils
  Inventor
By Atty

UNITED STATES PATENT OFFICE.

LÉON DATHIS, FILS, OF PARIS, FRANCE.

BAKER'S OVEN.

SPECIFICATION forming part of Letters Patent No. 323,643, dated August 4, 1885.

Application filed September 1, 1884. (No model.) Patented in France October 17, 1883, No. 178,034.

*To all whom it may concern:*

Be it known that I, LÉON DATHIS, Fils, of Paris, France, engineer, have invented Improvements in the Manufacture of Bread and the Apparatus Therefor, of which the following is a specification.

This invention relates to an improvement in devices for baking bread; and the invention consists in the construction, as hereinafter described, and more particularly recited in the claims.

Figure 1:
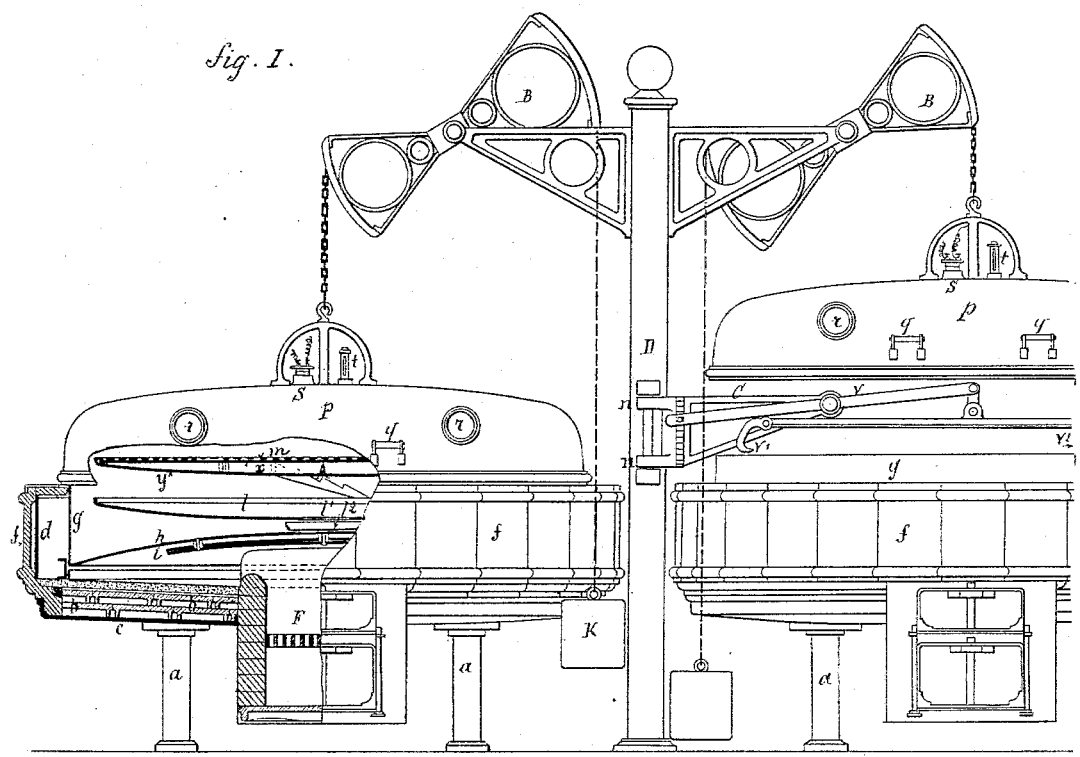
Figure 2:
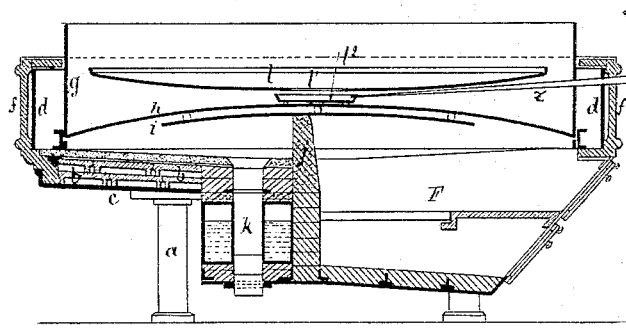
Figure 3:
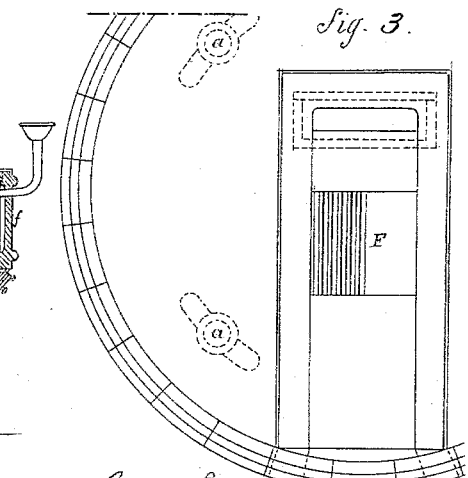

In the drawings illustrating my invention, Figure 1 represents a front elevation of a pair of ovens, one at the left in partial section, the one at the right having a portion broken away to contract the extent of the figure; Fig. 2, a transverse vertical section of one of the ovens; Fig. 3, a plan view of one of the ovens, the cover removed.

The method of preparing the dough constitutes no part of my present invention, it only being necessary that it shall be prepared and permitted to rise, say, in the usual manner.

In the ovens of this construction the rays of heat are well distributed, so as to constantly surround the loaves or other articles inserted therein to be baked with an absolutely uniform heat. Each one of such ovens is supported by four or more uprights or columns, $a\ a$, of cast-iron or other suitable material. It consists of a bottom composed of fire-bricks or clay plates $b\ b$ joined together upon a plate, $c$, of sheet-iron, cast-iron, or other metal. The whole assumes a circular shape, and is surrounded with a double cylindrical wall, $d$, made of sheet-iron and of clay plates $f$, supported together by means of angle-irons, or in any other convenient manner. The inner body of the oven consists of a cylindrical part, $g$, made of sheet iron, and closed air-tight by means of sole-plate $h$, of convex configuration, and with a double wall, $i$. The sole-plate $h$ receives direct the whole of the heat evolved by the fire in hearth F, of which the fire-bridge $j$ firmly leans against the double wall $i$, so as to force the hot gases to spread below the whole of the surface of the sole before they escape through flues $k$, which lead them into the main escape-chimney. Above sole-plate $h$, I arrange another hollow diaphragm, $l$, perforated at $l'$, and adapted to distribute the heat throughout the whole bulk of the oven. Such diaphragm may be placed above a small vessel, $l^2$, which may receive at intervals an injection of water while the breads or cakes are being placed into the oven, or at any other desirable moment, with a view to produce instantly a certain moist condition by means of vapor, which spreads all round the cold loaf just brought into the oven. Now, above this diaphragm is placed the upper plate, A, carrying in one lot or series all the loaves or cakes to be baked. This plate consists of a convex sheet-iron plate, $y$, and a plain plate, $x$, so that a layer of air may be inclosed between the two plates. The object sought to be accomplished, by so providing air between said plates is, first, to make the amount of air uniform all over the area of plate $x$, and, second, to oppose to the passage of such heat more or less resistance, according as the empty space between plates $x$ and $y$ is larger or smaller, and, third, to settle with an absolute certainty the due equilibrium between direct and reverberating heat.

Above the plate $x$ I arrange a stand, $m$, consisting of a metal lattice, grating, open diaphragm, or net-work, which is interposed between the bottoms of the loaves, cakes, &c., and plate A. By this means the bread, while it is in immediate contact with the plate, as soon as it is placed into the oven avoids the interposition of a cold body between it and this plate, forming a sole-plate.

Plate A is removed from and reintroduced into the oven according as it is desired to place the loaves into the same or withdraw them therefrom. This is effected by means of a bracket, C, hinged at $n\ n$ upon a column, D, and carrying a lever, $v$, provided with a strap with clamps $v'\ v'$. These and the lever $v$ enable plate A when charged with bread, to be raised and lowered at will. This arrangement of hinged bracket C allows of operating two adjoining ovens at a time. These ovens are, besides, provided on the front side with turning plates, upon which those plates are disposed which are to carry the loaves, so that the latter may be conveniently arranged thereon.

Each oven is suitably closed by a cover, $p$, forming the reverberating dome, and capable of moving up and down by means of a beam, B, with a balance-weight. Such cover is provided with handles $q\ q$, with looking-holes $r\ r$ fitted with glimmer, and allowing of the inspection of the inside, and with a thermometer, $t$.

To this particular class of baking-ovens I apply, by a novel and peculiar method, the use of vacuum incandescent electric lamps, so as to illuminate the loaves, &c., within the oven while the same are being baked. I have shown in the drawings a lamp, S, of Swan's system, arranged inside the oven and receiving its current from conducting-wires charged from any suitable source of electricity.

This class of lamps, which require no air for their operation, enables me to permanently and uniformly light the interior of my baking-ovens—a result which, as yet, has been accomplished by none of the lighting methods hitherto known.

Having thus fully described and shown all parts of my invention, what I claim, and desire to secure by Letters Patent, is—

1. The herein-described baking-oven, consisting of the cylindrical wall $g$, forming an inclosing-chamber surrounded by a double wall, $d\ f$, said chamber having a convex bottom or sole-plate, $h$, a hearth or fire-box, F, open to the under side of the convex bottom, a hollow diaphragm, $l$, above the said bottom $h$, and constructed with a central perforation, $l'$, the removable plate consisting of the convex sheet-metal plate $y$, and the plain plate $x$, above said plate $y$, and so as to form an air-space between the two, the said removable plate adapted to receive the loaves to be baked, and a cover, P, adapted to close the top of the oven, but removable therefrom to permit the introduction or removal of the plate carrying the loaves, substantially as described.

2. The herein-described baking-oven, consisting of the cylindrical wall $g$, forming an inclosing-chamber surrounded by a double wall, $d\ f$, said chamber having a convex bottom or sole-plate, $h$, a hearth or fire-box, F, open to the under side of the convex bottom, a hollow diaphragm, $l$, above the said bottom $h$, and constructed with a central perforation, $l'$, the vessel $l^2$, arranged to receive an injection of water, the removable plate consisting of the convex sheet-metal plate $y$, and the plain plate $x$ above said plate $y$, and so as to form an air-space between the two, the said removable plate adapted to receive the loaves to be baked, and a cover, P, adapted to close the top of the oven, but removable therefrom to permit the introduction or removal of the plate carrying the loaves, substantially as described.

In testimony whereof I have signed my name to this specification before two subscribing witnesses.

LÉON DATHIS, FILS.

Witnesses:
DAVID T. S. FULLER,
ALBERT CAHEN.